(12) United States Patent
Rabasco et al.

(10) Patent No.: US 7,459,186 B2
(45) Date of Patent: *Dec. 2, 2008

(54) MASONRY SEALING COMPOSITIONS COMPRISING SEMI-CRYSTALLINE ETHYLENE-VINYL ACETATE POLYMER EMULSIONS

(75) Inventors: John Joseph Rabasco, Allentown, PA (US); Geoffrey James Dearth, Victorville, CA (US); Charles Raymond Hegedus, Allentown, PA (US); Frank Ralph Pepe, Quakertown, PA (US); Bertil Vincent Mukkulainen, Fogelsville, PA (US)

(73) Assignee: Wacker Chemical Corporation

( * ) Notice: Subject to any disclaimer, the term of this patent is extended or adjusted under 35 U.S.C. 154(b) by 572 days.

This patent is subject to a terminal disclaimer.

(21) Appl. No.: 11/197,921

(22) Filed: Aug. 5, 2005

(65) Prior Publication Data
US 2007/0031605 A1    Feb. 8, 2007

(51) Int. Cl.
B05D 3/02    (2006.01)
(52) U.S. Cl. .................................. 427/393.6
(58) Field of Classification Search ............... 427/393.6
See application file for complete search history.

(56) References Cited

U.S. PATENT DOCUMENTS

| | | | |
|---|---|---|---|
| 2,412,470 A | 12/1946 | Norton |
| 2,574,168 A | 11/1951 | Brick |
| 2,672,455 A | 3/1954 | Currie |
| 2,678,893 A | 5/1954 | Kauppi |
| 2,735,791 A | 2/1956 | Peyrot et al. |
| 3,772,065 A | 11/1973 | Seiler |
| 4,147,851 A | 4/1979 | Raynolds |
| 4,342,796 A | 8/1982 | Brown et al. |
| 4,360,994 A | 11/1982 | Hodges |
| 4,476,282 A | 10/1984 | Koerner et al. |
| 4,517,375 A | 5/1985 | Schmidt |
| 4,525,213 A | 6/1985 | Linn |
| 4,529,758 A | 7/1985 | Traver |
| 4,648,904 A | 3/1987 | DePasquale et al. |
| 4,717,599 A | 1/1988 | Merrill |
| 4,753,977 A | 6/1988 | Merrill |
| 4,931,505 A | 6/1990 | Miyazaki et al. |
| 5,424,474 A | 6/1995 | Pohmer et al. |
| 5,919,527 A | 7/1999 | Fitzgerald et al. |
| 6,037,429 A | 3/2000 | Linert et al. |
| 6,120,892 A | 9/2000 | Fitzgerald et al. |
| 6,271,289 B1 | 8/2001 | Longoria et al. |
| 6,646,088 B2 | 11/2003 | Fan et al. |
| 6,689,854 B2 | 2/2004 | Fan et al. |
| 6,803,109 B2 | 10/2004 | Qiu et al. |
| 2006/0189759 A1* | 8/2006 | Walter et al. ............... 525/192 |

FOREIGN PATENT DOCUMENTS

| | | |
|---|---|---|
| CS | 252126 B1 | 5/1988 |
| JP | 10287482 A2 | 10/1998 |
| JP | 2002138241 | 5/2002 |

OTHER PUBLICATIONS

Mason Hayek, "Waterproofing and Water/Oil Repellency", Kirk-Othmer Encyclopedia Of Chemical Technology, vol. 24, pp. 460-462, 3d ed., 1979.

* cited by examiner

*Primary Examiner*—Erma Cameron

(57) ABSTRACT

This invention relates to an improved process for providing water repellency and stain resistance to a masonry surface wherein an aqueous based water repellant polymeric coating is applied thereto and the water removed leaving a water repellent polymeric film adhered to the masonry surface. The improvement in the process resides in the use of an aqueous emulsion of a semi-crystalline ethylene-vinyl acetate polymer formed by emulsion polymerization wherein the polymer has:

(a) a crystalline melting point ranging from 35 to 110° C. measured at a heat rate of 20° C. per minute; and,
(b) a tensile storage modulus of at least $1 \times 10^5$ dynes/cm$^2$ at a temperature of 115° C. and measured at 6.28 rad/sec.

16 Claims, No Drawings

MASONRY SEALING COMPOSITIONS COMPRISING SEMI-CRYSTALLINE ETHYLENE-VINYL ACETATE POLYMER EMULSIONS

BACKGROUND OF THE INVENTION

Masonry products have been widely used in the construction industry and include building materials such as cementious materials, concrete, brick, tile, stone, grout, and like substances. Driveways, garage flooring, concrete block, brick fronts, fireplaces, fireplace hearths, as well as tiled floor, wall and counter top surfaces are exemplary applications. Masonry surfaces are porous and if left unprotected can deteriorate from exposure to water and they can become discolored. For example, water penetration can cause spalling or lead to discoloration via microbial growth. Tiles and grouts employed in homes come in contact with various foods and liquids, e.g., fruit juice, coffee, oil(s), ketchup, mustard, and the like that can cause discoloration. Motor oils, brake-oils, and transmission fluids can cause discoloration of garage floors. Therefore, it has been common practice to coat masonry surfaces with materials capable of rendering them resistant to water, oils, and other contaminants.

Coatings for masonry have been generally of two types, one type being a waterproof coating and another type being a water repellant coating. A coating of the waterproof type renders the surface completely impervious to both liquid water, water vapor, and other contaminants. On the other hand a coating of the water repellent type renders the surface impervious to water in the liquid phase but permeable to water in the gas phase.

Exemplary of materials for the waterproofing of masonry surfaces are water proof membranes such as polyvinyl chloride, polyethylene, butyl rubber, and sealants such as tar, asphalt, paints, polyurethane, epoxy or mastics. While these waterproofing agents can offer excellent resistance to water penetration and other contaminants, they can alter the appearance of the masonry surface, e.g., they may change the color of the surface or leave it with a shine. Waterproofing treatments can also trap moisture within the masonry surface and promote spalling.

Exemplary of water-repellent treatments for masonry surfaces include metal stearates, oils, waxes, acrylates (both polymers and monomers), silicones (solvent-based and emulsion), siliconates, silanes and, fluorochemicals. In contrast, to water proofing coatings, water repellent coatings, because they are permeable to water vapor, do not trap moisture and, therefore they can reduce spalling. In addition most water repellent coatings do not alter the appearance of a porous masonry.

The following references are illustrative of compositions and processes for the treatment of masonry surfaces to provide water repellency and other properties thereto:

U.S. Pat. No. 2,412,470 discloses a process for treating a solid body to render it water repellent which comprises contacting said body with a composition containing, as the active ingredient thereof, a mixture consisting essentially of from about 2.8 to 99.2 weight percent trimethyl silicon chloride and from about 97.2 to 0.8 weight percent silicon tetrachloride.

U.S. Pat. No. 2,574,168 discloses a process for rendering porous masonry structures water repellent by applying a dilute liquid comprising an organic solvent solution of a silicone resin in its B-staged partially condensed form to the surface.

U.S. Pat. No. 3,772,065 discloses the use of alcoholic solutions of alkyltrialkoxysilanes to impart water repellency to masonry surfaces.

U.S. Pat. No. 4,360,994 discloses the use of latex compositions comprised of an acrylonitrile/butadiene copolymer for providing water repellency to masonry surfaces.

U.S. Pat. No. 4,648,904 discloses the use of an aqueous emulsion of a hydrolyzable silane in treating masonry surfaces in providing water repellency thereto.

U.S. Pat. Nos. 4,717,599 and 4,753,977 disclose methods for rendering masonry water repellent which comprises (a) contacting the masonry with a solution comprising an organopolysiloxane resin selected from the group consisting of resins containing $R_3SiO_{0.5}$ units and $SiO_2$ units, resins containing $R_3SiO_{0.5}$ units, and resins containing $R_2SiO_2$ units and $SiO_2$ units, and (b) evaporating the solvent.

U.S. Pat. No. 5,919,527 and U.S. Pat. No. 6,120,892 disclose the use of waterborne fluoropolymer solutions for treating hard surfaces, such as masonry, to impart water, oil, and stain repellency.

U.S. Pat. No. 5,424,474 disclose the use of fluorine-containing phosphate esters on hard surfaces, such as, ceramics, stone, masonry, wood, and plastics to repel water, grease, oil, and dirt.

JP2002138241 (abstract) discloses a water repellant coating containing organic solvents, alkoxysilanes, and ethylene polymers for use in architectural concrete. It was reported that a paving concrete board was coated with a solution containing ethylene-vinyl acetate polymer 5, decyltrimethoxysilane 10, and Solvesso 100 (aromatic hydrocarbon) 85 parts, dried, coated with Mowinyl 700 (methyl methacrylate-butyl acrylate copolymer emulsion) and dried, resulting in good appearance after spraying with water.

JP10287482 (abstract) discloses surface finishing agents for forming coatings on porous concrete. The agents are synthetic resin liquid emulsions showing high water resistance and gas permeability. The resins may mainly contain ethylene-vinyl acetate (EVA) polymers or acrylic ester-styrene copolymers.

CS252126 (abstract) discloses poly(vinyl acetate)-containing coating with resistance to water. The coating is reported to be useful on brick, concrete, and other surfaces for preventing staining and is prepared from an aqueous composition containing poly(vinyl acetate) 10-15, white pigment 8-15, $CaCO_3$ 8-15, preservative based on mineral oil 6-12, alkaline $C_{10-18}$-alkyl sulfates 0.05-0.1, water-soluble dye 0.1-2, and disinfectant 0.1-2%.

SUMMARY OF THE INVENTION

This invention relates to an improved process for providing water repellency and stain resistance to a masonry surface wherein an aqueous based water repellant polymeric coating is applied thereto and the water removed leaving a water repellent polymeric film adhered to the masonry surface. The improvement in the process resides in the use of an aqueous emulsion of an ethylene-vinyl acetate (EVA) polymer formed by emulsion polymerization and wherein a portion of the ethylene is present in crystalline form. The semi-crystalline ethylene portion of the polymer offers a hydrophobic, low energy film surface that resists penetration and staining by water, grease, oils, and other potential staining contaminants.

Several advantages can be achieved through the process described here and some of these include:

an ability to impart water repellency and stain resistance to masonry surfaces;

an ability to tolerate environmentally high temperatures without degradation; and, an ability to employ environmentally compatible aqueous based compositions as a means of affording substantially non-discoloring water repellent films to masonry surfaces.

DETAILED DESCRIPTION OF THE INVENTION

Masonry surfaces are sealed from penetration by water and other contaminants by the use of an aqueous-based emulsion polymerized EVA polymer containing crystalline ethylene segments. Because of the ethylene crystallinity, the normally water sensitive EVA polymers now become useful for imparting water repellency and stain resistance to masonry substrates.

By the term "masonry" as used herein, is meant any porous inorganic substrate, particularly building compositions including structural ceramics such as common brick, paving brick, face brick, sewer pipe, drain tile, hollow block, terra cotta, conduits, roofing tile, flue lining, cements such as Portland cement, calcined gypsum products, e.g., molding and building plaster and stucco, magnesia cement, and grouts.

The aqueous-based EVA polymer emulsions suited for use in providing water repellency and stain resistance to masonry surfaces are EVA polymer emulsions that form clear films. EVA as used herein indicate polymers with any level of ethylene that contain crystalline segments resulting from ethylene linkages. For example, the EVA polymer can contain 10 to 85 wt % ethylene and 15 to 90 wt % vinyl acetate, based on the total weight of the polymer; or 20 to 75 wt % ethylene and 25 to 80 wt % vinyl acetate; or 25 to 65 wt % ethylene and 35 to 75 wt % vinyl acetate; or 50 to 70 wt % ethylene and 30 to 50 wt % vinyl acetate, based on the total weight of polymer. The polymers are prepared by emulsion polymerizing ethylene and vinyl acetate, preferably with functional monomer(s), in the presence of a stabilizing system consisting essentially of a surfactant or a cellulosic protective colloid in combination with a surfactant.

The EVA polymers are further characterized with respect to the distribution of vinyl acetate and of ethylene in the EVA polymer as having:

(a) a crystalline melting point ($T_m$) ranging from 35 to 110° C., preferably 50 to 90° C.; measured at a heat rate of 20° C./minute and, (b) a tensile storage modulus of at least $1 \times 10^5$ dynes/$cm^2$ at 115° C. measured at 6.28 rad/sec.

In addition, the EVA polymers should have:

(c) a crystalline heat of fusion ($H_f$) ranging from 5 to 100 joules per gram (J/g), preferably 15 to 70 J/g;

(d) a glass transition temperature ($T_g$) of +25° C. to about −35° C.; and (e) be non-blocking at temperatures of about 50° C.

Additional comonomers can be polymerized into the EVA polymer backbone and such comonomers include carboxylic acids such as acrylic acid, methacrylic acid, crotonic acid, and isocrotonic acid; alpha, beta-unsaturated $C_4$-$C_{10}$ alkenedioic acids such as maleic acid, fumaric acid, and itaconic acid; $C_1$ to $C_{15}$ alkyl vinyl ester; a $C_1$ to $C_{15}$ alkyl acrylate or a $C_1$ to $C_{15}$ alkyl methacrylate, such as methyl(meth)acrylate, ethyl (meth)acrylate, propyl(meth)acrylate, butyl(meth)acrylate, and 2-ethylhexyl(meth)acrylate; a $C_1$ to $C_6$ hydroxyalkyl (meth)acrylate, such as, hydroxyethyl(meth)acrylate and hydroxypropyl(meth)acrylate; $C_1$-$C_{18}$ alkyl esters or esters with $C_1$-$C_{18}$ alkanols, such as methanol, ethanol, propanol, butanol, and 2-ethylhexanol; vinyl halides, such as vinyl chloride; mono and diesters of alpha, beta-unsaturated $C_4$-$C_{10}$ alkenedioic acids such as maleic acid, fumaric acid, and itaconic acid; $C_1$-$C_{18}$ alkanols; nitrogen containing mono-olefinically unsaturated monomers, particularly nitriles, amides, N-methylol amides, $C_1$-$C_4$ alkanoic acid ethers of N-methylol amides and allylcarbamates, such as acrylonitrile, acrylamide, methacrylamide, N-methylol acrylamide, N-methylol methacrylamide, N-methylol allylcarbamate; and $C_1$-$C_4$ alkyl ethers or $C_1$-$C_4$ alkanoic acid esters of N-methylol acrylamide, N-methylol methacrylamide and N-methylol allylcarbamate; sodium vinyl sulfonate; and 2-acrylamido-2-methyl propanesulfonate. The monomers can be incorporated in minor amounts, e.g. from 0 to about 10% by weight, based on the total weight of the polymer.

The usefulness of EVA emulsion polymers and their application as a water repellent coating for masonry surfaces are dictated by the polymer properties which are in turn affected by many factors outside the specific formulation employed, e.g., the monomers employed, monomer ratio, initiator level and surfactant package, as well as the polymerization procedure. For example, because vinyl acetate and ethylene have significantly different vapor pressures when subjected to the polymerization conditions described herein, and because ethylene is difficult to solubilize in the polymerization medium, one can dramatically affect the distribution of the vinyl acetate and ethylene within the polymer. Thus, two polymers having substantially equal levels of vinyl acetate and ethylene can have substantially different structures and dramatically different properties. The EVA polymer emulsions described herein capitalize on this fact.

Crystalline polyethylene domains in the polymer impart a $T_m$ and $H_f$ to the polymer. It has been found that by influencing the balance of amorphous ethylene domains and crystalline ethylene domains in the EVA polymer, one can generate a range of aqueous copolymer dispersions having a range of $T_g$, $T_m$ and $H_f$, and a high tensile storage modulus at high temperatures; i.e., temperatures of about 115° C. Conventional VAE emulsion polymers, as opposed to the EVA polymers herein, prepared by batch polymerization having from 20 to 35% ethylene may exhibit high tensile storage modulus at elevated temperature but these conventional VAE emulsion polymers themselves do not exhibit a $T_m$ nor do they have an $H_f$ because these polymers do not have the ethylene crystallinity exemplified by the EVA polymers described herein. In conventional VAE emulsion polymers, the ethylene units are largely incorporated in an amorphous state and there is a substantial absence of crystalline ethylene domains.

The tensile storage modulus profile for these EVA polymers provides an insight into the distribution of vinyl acetate and ethylene in the polymer and the melt flow characteristics. The polymers described herein maintain a high viscosity and resistance to flow at temperatures well above their melt temperatures. The modulus should be at least $1 \times 10^5$ in dynes/$cm^2$, (preferably $2 \times 10^5$) at 115° C. as measured at a test frequency of 6.28 rad/sec.

One preferred way to enhance crystalline domain formation of ethylene in the EVA polymer is to delay the addition of vinyl acetate during the polymerization process such that the unreacted vinyl acetate level present in the reactor is minimal at different stages during the process, i.e., below 5% unreacted free vinyl acetate monomer. Particularly, it is preferred to stage the addition of vinyl acetate in the polymerization process over an initial period of time. Typically, one completes the addition within 75% of the total polymerization period and generally within 3 hours or less. Thus, vinyl acetate-ethylene polymerization can take place in one stage where most, but not all, of the ethylene will reside in amorphous regions, and the formation of the majority of crystalline ethylene domains can occur in another stage of the polymerization process.

In the preferred process for effecting polymerization and the formation of EVA polymers for masonry sealing applications, polymerization of ethylene, vinyl acetate, and optionally a functional monomer, is initiated by thermal initiators or by redox systems. A thermal initiator is typically used at temperatures of about 60° C. or higher, preferably about 70° C. or higher. Redox systems can be used over a wide range of temperatures, but are typically used at temperatures of about 60° C. or lower.

The amount of initiator used in the process typically is substantially higher than used in prior processes for forming aqueous based vinyl acetate/ethylene dispersion polymers. Typically, the level of initiator is at least 0.5% and typically greater than 0.8% by weight of the total monomer charged. In addition, it is preferred that the initiator is added over the time of polymerization. It is believed that a high radical flux created by the higher levels of initiator facilitates ethylene incorporation during this low pressure polymerization process and leads to crystalline ethylene segments and a branched polymer architecture in the resulting copolymer and thus exhibits a higher tensile storage modulus at elevated temperatures, thermal melting point, and a heat of fusion. Thermal initiators are well known in the emulsion polymer art and include, for example, ammonium persulfate, sodium persulfate, and the like. Suitable redox systems are based upon reducing agents and peroxides. Combinations of reducing agents, such as sodium formaldehyde sulfoxylates (SFS) or erythorbates and peroxides such as t-butyl hydroperoxide (t-BHP) and hydrogen peroxide are representative.

The ethylene and, optionally, other monomers, then are introduced under pressure of less than about 2000 psig (13, 891 kPa), and agitation, and the temperature increased to reaction temperature. Initiator, vinyl acetate, and emulsifier are staged or added incrementally over the reaction period, and the reaction mixture maintained at reaction temperature for a time required to produce the desired product. Typical pressures range from 1200 to 1800 psig (8375 to 12,512 kPa).

Chain transfer agents, water soluble or oil soluble, can be use in the preferred polymerization and formation of ethylene-vinyl acetate polymers for masonry sealing applications. Any of the common chain transfer agents known in the emulsion polymerization art can be used, such as mercaptan derivatives. Dodecylmercaptan is an example of an oil soluble chain transfer agent. For example, dodecylmercaptan can be dissolved in vinyl acetate monomer and introduced to the reactor via the monomer delay feed. Chain transfer agents are typically used in amounts less than 2.0 weight percent, based on total polymer weight.

The stabilizing system for emulsion polymerization can comprise surfactants and/or emulsifiers. It can also contain a cellulosic colloid, such as hydroxyethyl cellulose (HEC), in combination with surfactants or emulsifiers. The protective colloid can be used in amounts of about 0.1 to 10 wt %, preferably 0.5 to 5 wt %, based on the total monomers.

The surfactant or emulsifier can be used at a level of about 1 to 10 wt %, preferably 1.5 to 6 wt %, based on the total weight of monomers and can include any of the known and conventional surfactants and emulsifying agents, principally the nonionic, anionic, and cationic materials, heretofore employed in emulsion polymerization. Among the anionic surfactants found to provide good results are alkyl sulfates and ether sulfates, such as sodium lauryl sulfate, sodium octyl sulfate, sodium tridecyl sulfate, and sodium isodecyl sulfate, sulfonates, such as dodecylbenzene sulfonate, alpha olefin sulfonates and sulfosuccinates, and phosphate esters, such as the various linear alcohol phosphate esters, branched alcohol phosphate esters, and alkylphenolphosphate esters.

Examples of suitable nonionic surfactants include the Igepal surfactants which are members of a series of alkylphenoxy-poly(ethyleneoxy)ethanols having alkyl groups containing from about 7 to 18 carbon atoms, and having from about 4 to 100 ethyleneoxy units, such as the octylphenoxy poly(ethyleneoxy)ethanols, nonylphenoxy poly(ethyleneoxy)ethanols, and dodecylphenoxy poly(ethyleneoxy) ethanols. Others include fatty acid amides, fatty acid esters, glycerol esters, and their ethoxylates, ethylene oxide/propylene oxide block polymers, secondary alcohol ethoxylates, and tridecylalcohol ethoxylates.

Summarizing, factors leading to crystalline ethylene domains within the polymer are pressure, temperature of polymerization and the level of initiator. Although pressure is influential in achieving higher ethylene concentration levels in the polymer, it also is a factor in determining whether the amount of ethylene which is present is in amorphous regions or crystalline domains. Temperature also is relevant in the formation of ethylene crystallinity. Lastly, the level of initiator is also a factor in developing EVA copolymers for masonry applications.

Average particle size distributions (by volume, as measured by Horiba light scattering) for the polymer particles of the emulsion polymers range from 0.05 micron to 2 micron, preferably 0.10 micron to 1 micron. Small particle size polymer particles are desired so that there is permeation of the pores in the surface of the masonry product.

Other ingredients can be incorporated into the formulated coating to improve properties further. Examples are wax particles or emulsions and/or silicone to improve water resistance, UV absorbers to improve weathering and durability, and mildewcides to improve resistance to mildew and fungus. Other additives traditionally used in coatings to improve application and performance properties, such as surfactants and defoamers, also can be included.

EXAMPLE 1

Formation of EVA Semi-Crystalline Polymer Emulsions Incorporating Acrylic Acid

A polymer emulsion containing crystalline ethylene segments was prepared by the following procedure: A one-gallon stainless steel pressure reactor was charged with the following mixture:

| Material | Mass charged, g |
| --- | --- |
| DI Water | 840 |
| Aerosol MA80I surfactant | 7.25 |
| Natrosol 250GR (2% aqueous solution) HEC | 420 |
| Sodium Citrate | 1 |
| Vinyl Acetate | 72 |

Aerosol MA801 anionic surfactant supplied by Cytec

Natrosol 250GR HEC (hydroxyethyl cellulose) supplied by Rhodia

The following delay mixtures were utilized:

| Material | Mass charged, g |
| --- | --- |
| Aqueous 8.24% ammonium persulfate containing 3.35% sodium bicarbonate | 93 |
| Rhodacal DS-10, diluted to 15% active | 260 |
| 94.5:5.5 Vinyl Acetate/Acrylic acid mixture | 586 |
| Ethylene | 1250–1400 psig for 5.5 hours |

Rhodacal DS-10 anionic surfactant supplied by Rhodia

Agitation at 100 rpm was begun with a nitrogen purge after charging the initial mixture to the reactor. Agitation was then increased to 1000 rpm and the reactor heated to 80° C. After pressurizing the reactor with ethylene to 1250 psig, 18 g of initiator solution was added at a rate of 1.0 grams/minute. When the 18 grams of initiator had been added, the initiator delay rate was reduced to 0.29 g/minute, the monomer delay was begun at 2.86 g/minute and the surfactant delay was begun at 0.62 g/minute. One hour after starting all delay feeds, the ethylene pressure was ramped to 1400 psig over the next 40 minutes at a linear rate increase. At the 4 hour mark, the vinyl acetate delay was stopped. At the 7.5 hour mark, the ethylene valve was closed. At the 8 hour mark, the surfactant delay and initiator delay were stopped, followed by holding the reaction mixture at temperature for another 30 minutes. The reaction was then cooled to 40° C., transferred to a degasser, and 2 g of Rhodaline 675 defoamer was added during and after this transfer. The product was then post-treated with iron, T-BHP and SFS to reduce residual unreacted vinyl acetate. The following properties of the resulting emulsion copolymer were measured:

| Polymer Composition (by solids calculation) | 53% Ethylene |
| --- | --- |
|  | 44.6% Vinyl acetate |
|  | 2.4% acrylic acid |
| $T_g$ Onset (° C.) | −29.6 |
| Viscosity (60/12 rpm) (cps) | 828/1430 |
| % solids | 50.4 |
| pH | 4.73 |
| $T_m$ (° C.)/Heat of Fusion (J/g) | 88.5/25.5 |

EXAMPLE 2

Formation of EVA Semi-Crystalline Polymer Emulsions Incorporating Acrylic Acid and Chain Transfer Agent A polymer emulsion containing crystalline ethylene segments was prepared by the following procedure: A one-gallon stainless steel pressure reactor was charged with the following mixture:

| Material | Mass charged, g |
| --- | --- |
| DI Water | 1100 |
| Aerosol MA80I | 10 |
| Sodium citrate | 1 |
| Monomer solution consisting of 94.71 wt % vinyl acetate, 4.71 wt % acrylic acid, and 0.571 wt % dodecylmercaptan | 120 |

Prior to the addition of the monomer solution, the mixture pH was adjusted to 4.5 with citric acid.

The following delay mixtures were utilized:

| Material | Mass charged, g |
| --- | --- |
| Aqueous 10.0 wt % ammonium persulfate containing 4.0 wt % sodium bicarbonate | 126 |
| Rhodacal DS-10, diluted to 15% active | 260 |
| Monomer solution consisting of 94.71% vinyl acetate, 4.71% acrylic acid, and 0.571% dodecylmercaptan | 540 |
| Ethylene | 1400 psig for 5.5 hours |

Agitation at 100 rpm was begun with a nitrogen purge. Agitation was then increased to 900 rpm and the reactor heated to 80° C. After pressurizing the reactor with ethylene to 1400 psig, 15 g of initiator solution was added at a rate of 1.0 g/minute. When the 20 g of initiator had been added, the initiator delay rate was reduced to 0.30 g/minute. At the 20 minute mark, the monomer delay was begun at 3.0 g/minute and the surfactant delay was begun at 0.72 g/minute. Ethylene pressure of 1400 psig was maintained for 5.5 hours. The vinyl acetate delay was stopped at the 3 hour mark. The ethylene supply was stopped at the 5.5 hour mark. The surfactant delay and the initiator delay were stopped at the 6 hour mark, followed by holding the reaction mixture at temperature for another 30 minutes. The reaction was then cooled to 40° C., transferred to a degasser, and 2 g of Rhodaline 675 defoamer was added. The following properties of the resulting emulsion copolymer were measured:

| Copolymer Composition (by solids calculation) | 50% Ethylene |
| --- | --- |
|  | 47.6% Vinyl acetate |
|  | 2.4% Acrylic acid |
| $T_g$ Onset (° C.) | −29.8 |
| Viscosity (60/12 rpm) (cps) | 310/635 |
| % solids | 48.9 |
| pH | 4.77 |
| $T_m$ (° C.)/Heat of Fusion (J/g) | 86.4/25.4 |

EXAMPLE 3

Formation of EVA Semi-Crystalline Polymer Emulsions Incorporating Acrylic Acid

A polymer emulsion containing crystalline ethylene segments was prepared by the following procedure: A one-gallon stainless steel pressure reactor was charged with the following mixture:

| Material | Mass charged, g |
|---|---|
| DI Water | 1100 |
| Aerosol MA80I | 10 |
| Sodium citrate | 1 |
| Monomer solution consisting of 95 wt % vinyl acetate and 5 wt % acrylic acid | 120 |

Prior to the addition of the monomer solution, the mixture pH was adjusted to 4.5 with citric acid.

The following delay mixtures were utilized:

| Material | Mass charged, g |
|---|---|
| Aqueous 10.0 wt % ammonium persulfate containing 4.0 wt % sodium bicarbonate | 89 |
| Rhodacal DS-10, diluted to 15% active | 260 |
| Monomer solution consisting of 95 wt % vinyl acetate and 5 wt % acrylic acid | 540 |
| Ethylene | 1400 psig for 5.5 hours |

Agitation at 100 rpm was begun with a nitrogen purge. Agitation was then increased to 1000 rpm and the reactor heated to 80° C. After pressurizing the reactor with ethylene to 1400 psig, 15 g of initiator solution was added at a rate of 1.0 g/minute. When the 15 g of initiator had been added, the initiator delay rate was reduced to 0.22 g/minute. At the 15 minute mark, the monomer delay was begun at 3.0 g/minute and the surfactant delay was begun at 0.72 g/minute. Ethylene pressure of 1400 psig was maintained for 5.5 hours. The vinyl acetate delay was stopped at the 3 hour mark. The ethylene supply was stopped at the 5.5 hour mark. The surfactant delay and the initiator delay were stopped at the 6 hour mark, followed by holding the reaction mixture at temperature for another 30 minutes. The reaction was then cooled to 37° C., transferred to a degasser, and 2 g of Rhodaline 675 defoamer was added. The following properties of the resulting emulsion copolymer were measured:

| | |
|---|---|
| Copolymer Composition (by solids calculation) | 47.5% Ethylene |
| | 49.9% Vinyl acetate |
| | 2.6% Acrylic acid |
| Tg Onset (° C.) | −27.5 |
| Viscosity (60/12 rpm) (cps) | 254/500 |
| % solids | 48.7 |
| pH | 4.47 |
| Tm (° C.)/Heat of Fusion (J/g) | 86.2/22.0 |

EXAMPLE 4

Formation of EVA Semi-Crystalline Polymer Emulsion Incorporating Acrylamide and Chain Transfer Agent A polymer emulsion containing crystalline ethylene segments was prepared by the following procedure: A one-gallon stainless steel pressure reactor was charged with the following mixture:

| Material | Mass charged, g |
|---|---|
| DI Water | 1000 |
| Aerosol MA80I | 8 |
| Rhodacal DS10 | 2 |
| Sodium citrate | 1 |
| Monomer solution consisting of 99.87 wt % vinyl acetate and 0.13 wt % dodecylmercaptan | 120 |

Prior to the addition of the monomer solution, the mixture pH was adjusted to 5.0 with citric acid.

The following delay mixtures were utilized:

| Material | Mass charged, g |
|---|---|
| Aqueous 10.0 wt % ammonium persulfate containing 4.0 wt % sodium bicarbonate | 119 |
| Rhodacal DS-10, diluted to 15% active | 242 |
| Monomer solution consisting of 99.87 wt % vinyl acetate and 0.13 wt % dodecylmercaptan | 610 |
| Aqueous 20.0 wt % acrylamide | 102 |
| Ethylene | 1400 psig for 5.5 hours |

Agitation at 100 rpm was begun with a nitrogen purge. Agitation was then increased to 300 rpm and the reactor heated to 80° C. After pressurizing the reactor with ethylene to 300 psig, 10 g of initiator solution was added at a rate of 1.0 g/minute. When the 10 g of initiator had been added, the initiator delay rate was reduced to 0.30 grams/minute. At initiation, the vinyl acetate monomer delay was begun at 9.5 g/minute, the acrylamide delay was begun at 0.30 g/min and the surfactant delay was begun at 1.20 g/minute. Ethylene was added to maintain a pressure of 300 psig. At the 1 hour mark, the vinyl acetate monomer delay was stopped, the agitation increased to 500 rpm, and the surfactant delay rate reduced to 0.60 g/min. Forty-five minutes later the agitation was increased to 900 rpm and an ethylene pressure ramp begun at a rate of 2.5 grams ethylene per minute. When the pressure reached 1450 psig, the ramp was stopped and ethylene was continually added to maintain this pressure of 1450 psig. At the 2 hour and 15 minute mark, the vinyl acetate monomer delay was started again at a rate of 0.25 g/min. At the 5 hour and 45 minute mark, the acrylamide, vinyl acetate, and surfactant delays were all stopped and the ethylene valve was closed to allow the pressure to decay. At the 6 hour and 15 minute mark, the initiator delay was stopped, followed by holding the reaction mixture at temperature for another 45 minutes. The reaction was then cooled to 40° C., transferred to a degasser, and 2 g of Rhodaline 675 defoamer was added. The emulsion was post-treated with iron, T-BHP, and SFS to further reduce the vinyl acetate levels. The following properties of the resulting emulsion copolymer were measured:

| | |
|---|---|
| Copolymer Composition (by solids calculation) | 34.5% Ethylene |
| | 63.7% Vinyl acetate |
| | 1.8% Acrylamide |
| Tg Onset (° C.) | +9.6 |
| Viscosity (60/12 rpm) (cps) | 41/41 |
| % solids | 46.1 |
| pH | 5.41 |
| Tm (° C.)/Heat of Fusion (J/g) | 81.8/15.2 |

EXAMPLE 5

Stain Resistance on Masonry Substrates

Test Procedure:

4 inch×4 inch (10 cm×10 cm) tiles of the masonry substrates to be tested (e.g. sandstone, limestone, marble, tile, grout, etc) were rinsed to remove any dust or dirt, and allowed to dry thoroughly, typically 1 to 3 days.

The emulsion polymer materials were diluted in water; the tiles were dipped for 10 seconds, removed and wait 10 seconds then re-dipped for 10 seconds. After the treated tiles were dried overnight, small amounts of the following food stains were placed at intervals on the tile surface and allowed to sit for 24 hours:

Wesson Oil
Ketchup
Italian salad dressing
Mustard
Bacon grease (hot)
Lemon juice
Coffee (black)
Grape juice
Coca Cola
Wine The contact angles, i.e., bead angles, were evaluated shortly after application of the fluid liquids, Wesson oil, grape juice, coffee, using the visual contact angle rating scale. Evaporation and penetration can impact the contact angles if evaluated over a longer time period.

After the 24-hr staining period, the food stains were blotted or lightly scraped from the tile surface. Hardened foods such as ketchup and mustard were wetted with water for a few minutes before scraping to soften them for easier removal. A commercial stone and tile cleaner were applied to the tile surface and a stiff bristle brush used to scrub the surface back and forth. The tiles then were rinsed with water and allowed to dry for 24 hours before rating.

Ratings:

The stains remaining on the tile surfaces after cleaning were rated as follows:

0—No stain
1—Very light stain
2—Light stain
3—Moderate stain
4—Heavy stain

For each treatment, the ratings for each masonry sample were added up to give a composite rating for that stone (maximum score=9 stains×4=36). Lower scores indicate better stain protection.

| PRODUCT | Un-Coated | Fluoro-chemical | Example 4 | Example 2 | Example 3 |
|---|---|---|---|---|---|
| WHITE MARBLE | | | | | |
| Coca Cola | 4 | 1 | 4 | ND | ND |
| Lemon Juice | 3 | 1 | 0 | ND | ND |
| Bacon Grease | 3 | 0 | 2 | ND | ND |
| Mustard | 4 | 1 | 2 | ND | ND |
| Ketchup | 2 | 0 | 0 | ND | ND |
| Wesson oil | 3 | 0 | 2 | ND | ND |
| Grape Juice | 3 | 2 | 2 | ND | ND |
| Coffee | 4 | 3 | 4 | ND | ND |
| Total | 26 | 8 | 16 | ND | ND |
| LIMESTONE | | | | | |
| Coca Cola | 4 | 0 | 0 | ND | ND |
| Lemon Juice | 3 | 4 | 2 | ND | ND |
| Bacon Grease | 4 | 0 | 4 | ND | ND |
| Mustard | 4 | 4 | 2 | ND | ND |
| Ketchup | 3 | 0 | 0 | ND | ND |
| Wesson oil | 4 | 0 | 2 | ND | ND |
| Grape Juice | 4 | 0 | 3 | ND | ND |
| Coffee | 4 | 3 | 3 | ND | ND |
| Total | 30 | 11 | 16 | ND | ND |
| GROUT | | | | | |
| Wesson Oil | 4 | 0 | ND | 1 | 1 |
| Grape Juice | 4 | 1 | ND | 2 | 1 |
| Mustard | 4 | 2 | ND | 3 | 3 |
| Coffee | 4 | 1 | ND | 1 | 1 |
| Total | 16 | 4 | ND | 7 | 6 |

The results show that the EVA polymer having ethylene crystallinity affords both water repellency and stain resistance to masonry type products. Although, in most cases the EVA polymer did not afford the protection afforded by a commercial fluorochemical designed as a water and stain repellant coating, the coating did afford significant improvement in stain resistance to an uncoated masonry surface.

What is claimed is:

1. In a process for providing water repellency and stain resistance to a masonry surface wherein an aqueous based polymeric coating is applied to the masonry surface and the water removed thereby leaving a polymeric coating adhered to the masonry surface, the improvement in such process which comprises the aqueous based polymeric coating is an aqueous-based ethylene-vinyl acetate polymer emulsion, wherein the ethylene-vinyl acetate polymer is comprised of crystalline ethylene segments and is prepared by emulsion polymerizing ethylene and vinyl acetate in the presence of a stabilizing system, said ethylene-vinyl acetate polymer having:
    (a) a crystalline melting point ranging from 35 to 110° C. measured at a heat rate of 20° C. per minute; and,
    (b) a tensile storage modulus of at least $1 \times 10^5$ dynes/cm$^2$ at a temperature of 115° C. and measured at 6.28 rad/sec.

2. The process of claim 1 wherein the ethylene-vinyl acetate polymer is comprised of from 15 to 90% by weight of polymerized units of vinyl acetate and from about 10 to 85% by weight of polymerized units of ethylene based upon the total weight of the polymer.

3. The process of claim 1 wherein the ethylene-vinyl acetate polymer is comprised of from 25 to 80% by weight of polymerized units of vinyl acetate and from about 20 to 75% by weight of polymerized units of ethylene based upon the total weight of the polymer.

4. The process of claim 1 wherein the ethylene-vinyl acetate polymer is comprised of from 35 to 75% by weight of polymerized units of vinyl acetate and from about 25 to 65% by weight of polymerized units of ethylene based upon the total weight of the polymer.

5. The process of claim 1 wherein the ethylene-vinyl acetate polymer is comprised of from 30 to 50% by weight of polymerized units of vinyl acetate and from about 50 to 70% by weight of polymerized units of ethylene based upon the total weight of the polymer.

6. The process of claim 2 wherein polymerized carboxylic acid units are present in said ethylene-vinyl acetate polymer in an amount from about 0.2 to about 10% by weight of said polymer.

7. The process of claim 6 wherein said ethylene-vinyl acetate polymer has a tensile storage modulus of at least $2 \times 10^5$ dynes/cm$^2$ at 115° C. and measured at 6.28 rad/sec.

8. The process of claim 7 wherein the ethylene-vinyl acetate polymer is comprised of polymerized units of ethylene, vinyl acetate, and acrylic acid.

9. The process of claim 2 wherein the crystalline heat of fusion of said ethylene-vinyl acetate polymer is from about 5 to 100 joules per gram as measured at a heat rate of 20° C. per minute.

10. The process of claim 9 wherein the glass transition temperature of the ethylene-vinyl acetate polymer is from +25° C. to about −35° C. as measured at a heat rate of 20° C. per minute.

11. The process of claim 9 wherein the crystalline melting point of the ethylene-vinyl acetate polymer ranges from 50 to 90° C. as measured at a heat rate of 20° C. per minute.

12. The process of claim 11 wherein the crystalline heat of fusion of the ethylene-vinyl acetate polymer ranges from 15 to 70 joules per gram as measured at a heat rate of 20° C. per minute.

13. The process of claim 11 wherein the volume average particle distribution of said ethylene-vinyl acetate polymer particles in said emulsion is from 0.10 micron to 1 micron.

14. The process of claim 1 wherein the crystalline heat of fusion of the ethylene-vinyl acetate polymer ranges from 15 to 70 joules per gram as measured at a heat rate of 20° C. per minute.

15. The process of claim 14 wherein the crystalline melting point of the ethylene-vinyl acetate polymer ranges from 50 to 90° C. as measured at a heat rate of 20° C. per minute.

16. The process of claim 15 wherein the ethylene-vinyl acetate polymer is comprised of from 30 to 50% by weight of polymerized units of vinyl acetate and from about 50 to 70% by weight of polymerized units of ethylene based upon the total weight of the polymer.

* * * * *